Dec. 12, 1944.  C. MOTT ET AL  2,364,644
CUTTING TORCH MACHINE
Filed April 4, 1941  3 Sheets-Sheet 1
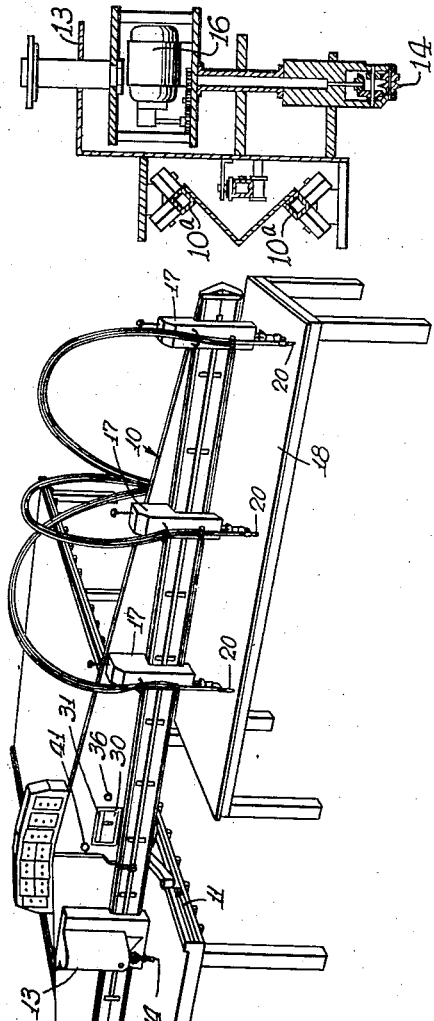
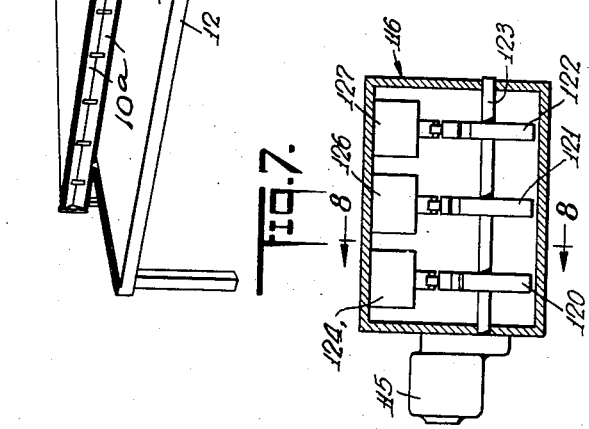
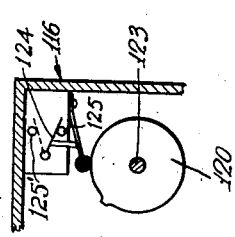
INVENTORS
Chester Mott
Alfred F. Chouinard
BY
ATTORNEYS Dec. 12, 1944.  C. MOTT ET AL  2,364,644
CUTTING TORCH MACHINE
Filed April 4, 1941  3 Sheets-Sheet 2
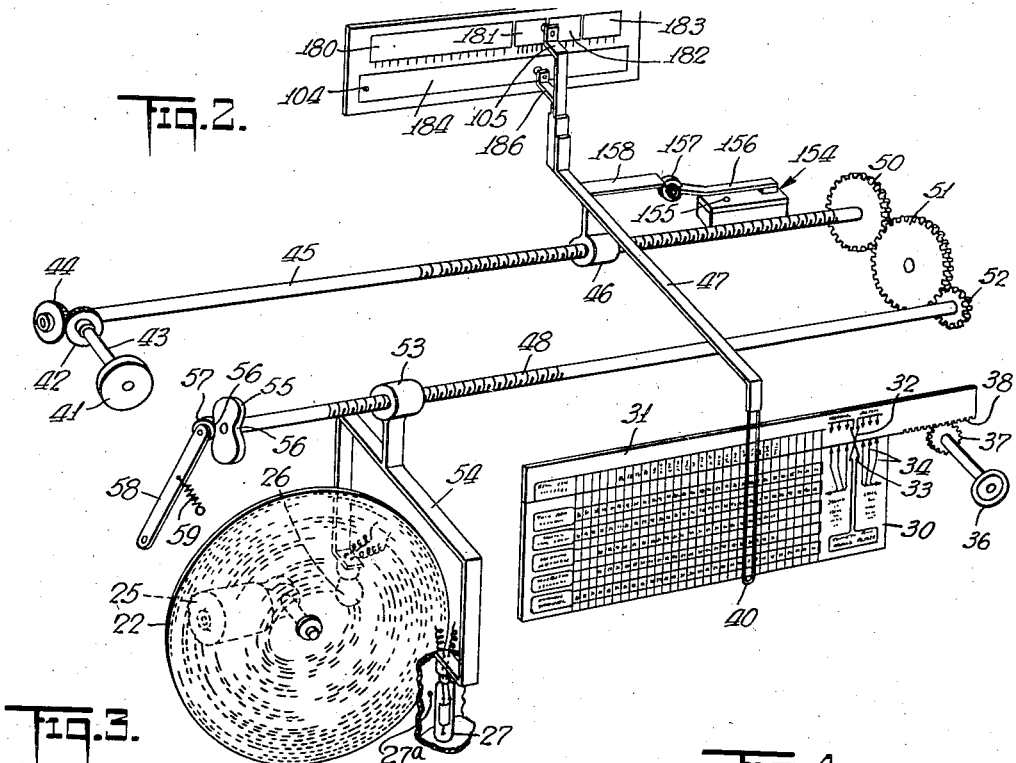
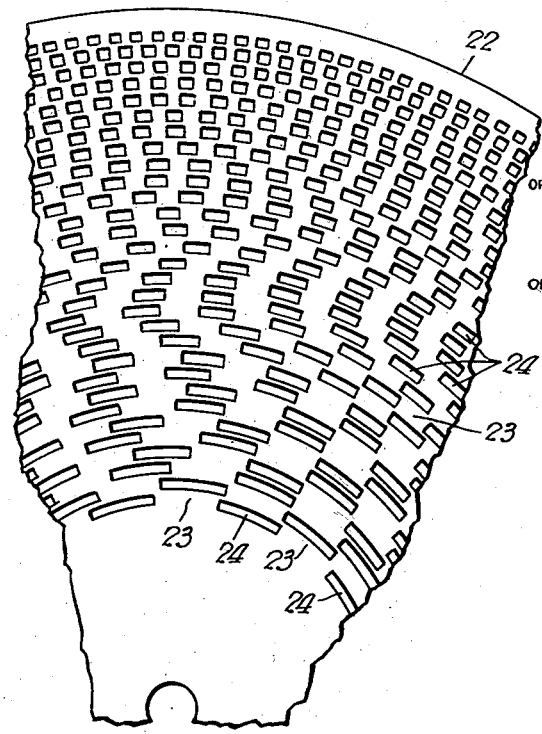
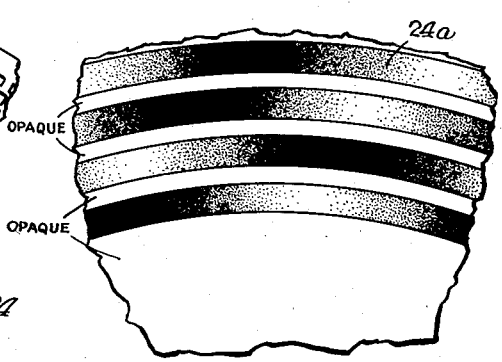
INVENTORS
Chester Mott
Alfred F. Chouinard
BY
Dean Fairbank Hirsch
ATTORNEYS Dec. 12, 1944.    C. MOTT ET AL    2,364,644
CUTTING TORCH MACHINE
Filed April 4, 1941    3 Sheets-Sheet 3
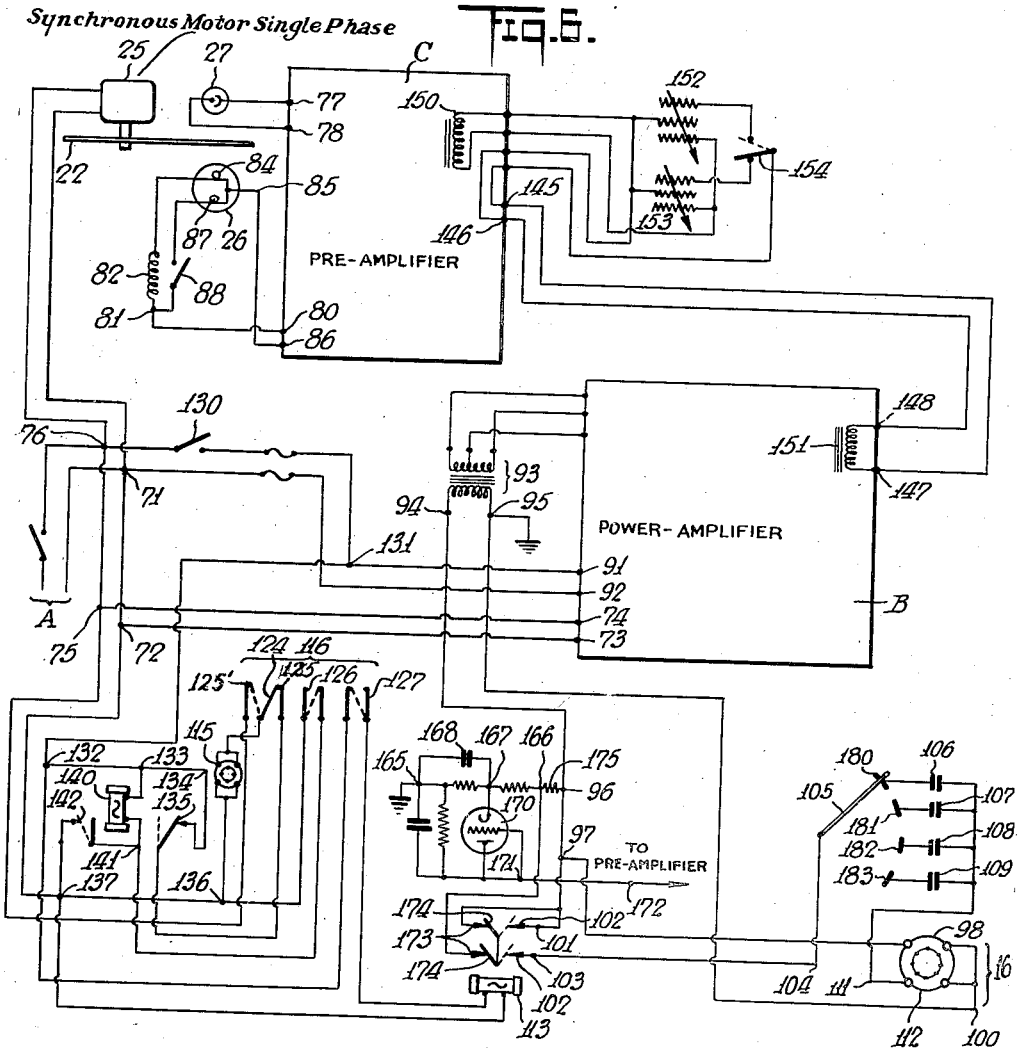
INVENTORS
Chester Mott
Alfred F. Chouinard
BY
Dean Fairbanks Hirsch
ATTORNEYS Patented Dec. 12, 1944

2,364,644

UNITED STATES PATENT OFFICE 2,364,644

CUTTING TORCH MACHINE

Chester Mott, Evanston, and Alfred F. Chouinard, Chicago, Ill., assignors to National Cylinder Gas Company, Chicago, Ill., a corporation of Delaware Application April 4, 1941, Serial No. 386,874

11 Claims. (Cl. 266—23)

The present invention relates to means for selectively controlling the speed of such motors in torch cutting machines for controlling the rate of cutting.

In torch cutting machines it is common practice to mount the oxy-acetylene cutting torch on a carriage, and to propel the carriage, and propel the torch along the carriage by an electric motor which drives a traction wheel, having guided movement in accordance with the path which it is desired to have the torch follow. For any given thickness of plate of given composition, the rate of travel of the torch should be constant, but the speed of travel must be different for plates of different thicknesses. Plates to be cut may vary from one-eighth of an inch or less to twelve inches or more in thickness. In practice the rate of travel of the torch is not varied directly as the plate thickness, because the cut is necessarily wider for a thick plate than for a thin one, and it is common practice to use a larger tip size and a higher cutting oxygen pressure for thicker plates than for thin ones. Thus for a twelve-inch plate the rate of torch travel may be about one-seventh the rate of travel for a one-eighth inch plate because of the necessity of delivering a larger volume of oxygen per unit of time, or per unit of plate area to be cut. Having determined the tip size and oxygen pressure to be needed for a plate of a given thickness, there is a definite speed of travel which should be imparted to the torch, and that speed should be kept constant. If it be too fast, the cut will not be completely through the plate; if it is too slow, an excessive amount of metal will be burned away, and the cut will be too wide; and if the speed varies, the cut will be irregular in width and the cut incomplete in places.

The speed of an ordinary series-wound electric motor may be controlled within general limits by means of a rheostat, but this speed cannot be kept constant within close limits by the rheostat or any other known means. With any given rheostat setting, the speed of the motor will vary with fluctuations in load; variations in the amount of current tapped off the line by other electrical equipment in the plant; warming up of the motor which changes the conductivity of the coils; warming up of the lubricating oil, which reduces its viscosity; and various other factors.

A synchronous motor will hold a definite and fixed speed, but that speed is one determined by the builder of the motor, (i. e. by the number of poles), and by the frequency of the current available, which is ordinarily 60 cycles, and this speed cannot be altered or modified by the user. There are some exceptions, for instance, where the motor is of the multi-pole type, and certain poles may be cut out of the circuit, but any such cutting in or out of the poles does not permit more than a very small number of speed changes, and does not permit any small preselected variations.

It is possible to operate a sychronous motor at one definite speed and obtain various required output speeds by means of mechanical gearing. The drawbacks to this method are loss of power through friction in the gearing, and the fact that considerably more space is required to accommodate the gearing and the gear shifting mechanism than is required to accommodate the synchronous motor, especially if the range of speeds is large.

One object of the present invention is to provide means for operating the synchronous motor of a torch cutting machine through a wide range of selective speeds by changing the frequency of the current impressed on said motor.

Another object is to provide means for operating the drive motor of a torch cutting machine through a wide range of selective speeds, while maintaining any chosen speed at an extremely high degree of constancy.

Another object is to provide means for selectively changing the speed of the drive unit of a torch cutting machine automatically according to the setting of a chart device, indexed with various plate thicknesses.

Another object is to provide a new and improved "cutting calculator" chart device, affording an easy means of indicating the correct values and adjustments required for each particular thickness of plate being cut, and permitting preliminary adjustments to correct for conditions which might alter these values.

Various other objects, features and advantages of the invention will be apparent from the following particular description and from an inspection of the accompanying drawings, in which Fig. 1 is a perspective view showing a torch cutting machine incorporating the features of the present invention.

Fig. 1a is a vertical section through the motor driven tracer unit.

Fig. 2 is a somewhat diagrammatic perspective view of a device for changing the frequency of the current operating the synchronous drive motor of a torch cutting machine.

Fig. 3 is a fragmentary plan view of a disc, forming part of the device for changing the frequency of the current to the synchronous drive motor of a torch cutting machine.

Fig. 4 is a fragmentary plan view of another form of disc.

Fig. 5 is a face view of the control chart on a larger scale than in Fig. 2.

Fig. 6 is a somewhat diagrammatic showing of a wiring diagram by means of which the speed of the synchronous drive motor of a torch cutting machine can be selectively changed.

Fig. 7 is a somewhat diagrammatic section showing a circuit controller forming a part of the electrical system of Fig. 6.

Fig. 8 is a section taken on line 8—8 of Fig. 7, and

Fig. 9 is a curve showing the output voltage-frequency characteristics of the current produced by the electrical system of Fig. 6.

As an example of a type of torch cutting machine in which our invention may be employed, we have shown somewhat schematically in Fig. 1 a cutting apparatus having a carriage 10, which travels horizontally on rails 10a over a table 12, on which may be supported a templet, drawing, pattern or other guide. A drive unit 13, which may be of any well known type, or which may be of the form shown and claimed in applicants' Patent 2,336,626, issued December 14, 1943, on an application copending herewith, is supported on carriage 10 for horizontal movement therealong crosswise of the movement of said carriage. This drive unit 13 has a tracing element 14 in the form of a tracer wheel, pointer, spot of light, or the like, which can be steered along the outline of the pattern or other guide to be copied or traced. This tracing element 14 may be in the form of a traction wheel driven from a motor 16 (Figs. 1a and 6) forming part of the movable unit 13, or a separate traction wheel may be provided driven from said motor. The traction wheel on the unit 13 is driven from the motor 16 as the tracing element 14 is steered over the table 12, to cause the movement of the carriage 10 along its rails, and the movement of said unit along said carriage.

One or more torch units 17 are supported on the carriage 10, and are connected to the drive unit 13 for movement therewith along said carriage and over the plate 18 to be cut, so that the cutting speed of these units corresponds to the speed of the traction wheel and its directly connected drive motor 16. These torch units 17 may be of any suitable well known construction, or may be of the form shown and claimed in the Chouinard Patent 2,336,596, issued December 14, 1943, on an application copending herewith.

As a feature of the present invention, the drive motor 16 is of the synchronous type, and the frequency of the current supplied thereto is changed in accordance with the desired cutting speed of the torches 20. This change in frequency is effected by creating periodic current pulsations at selective frequencies depending on the desired torch cutting speed, and amplifying these pulsations to a value necessary to operate the synchronous motor 16. The construction and arrangements of parts so far as concerns the controlling of the synchronous motor, when used for purposes other than in connection with and as a part of the present application, are claimed in applicants' divisional application Serial No. 522,566, filed February 16, 1944.

One form of construction for obtaining current pulsations of selective frequencies is shown in Figs. 2 and 3, and comprises a disc 22, which is provided with a plurality of concentric annular series or rows of alternate opaque segments 23, and light transmitting segments 24, and which is driven at constant speed from a synchronous motor 25 through suitable reduction gearing.

The light transmitting segments 24 may constitute slots in an opaque disc, or the disc 22 may be of glass or other suitable transparent material, coated or fired with a black pigment, or otherwise rendered opaque at all sections except at the light transmitting sections 24.

A source of light 26 shown in the form of an exciter lamp, and a light reactive device 27 shown in the form of a shielded photo-electric cell are disposed on opposite sides of the disc 22, and are movable in unison radially of said disc into registry with any selective row of light transmitting segments 24. When one of these segments 24 moves into registry with the line of light between the lamp 26, and the aperture 27a of the shield around the photo-electric cell 27, current is generated in said cell, and when an opaque segment 23 moves into said line of light, the generation of current in said cell stops. As a result, there is generated in the photo-electric cell 27 a pulsating current having a frequency depending on the number of light transmitting segments 24 in the registering row, brought into and out of position per unit of time.

The number of light transmitting segments 24 in each row varies according to the desired speed of the motor 16 and therefore of the torch. For instance the inner row may have ten transparent sections 24 and ten opaque sections 23 alternately arranged. With the disc 22 making two revolutions per second, the frequency obtained by the inner row is 20 cycles per second (one transparent and one opaque section constituting one cycle). The next row may be arranged to generate 22 cycles, the following row 24 cycles, and so on up to the outer row which may be arranged to generate 400 cycles. With this range of available frequency it is possible to vary the speed of the cutting torches from 2 to 40 inches per minute to cut plates ranging from the thinnest to the thickest.

Instead of providing well defined alternate opaque and transparent sections 23 and 24 as shown in Fig. 3, it is preferable to make the disc as shown in Fig. 4, with the light transmitting sections 24a graded from absolute transparency to absolute opacity, to produce sinusoidal or similar form of undulated pulsations.

As far as certain aspects of the present invention are concerned, other means may be provided for obtaining current of selective frequencies. For instance, alternating current may be induced in a coil by means of a steel disc having a plurality of annular rows of slots. With the coil opposite one of said rows, current will be induced therein when the solid parts of the disc pass opposite said coil, the induced current diminishing to zero as the slots pass opposite said coil.

Also as far as certain aspects of the invention are concerned, a standard type of signal generator well known in the art can be employed to obtain minute current pulsations of selective frequency.

As a feature of the present invention, the change in frequency of the current to the motor 16 is effected automatically upon the setting of a "cutting calculator" chart device indexed with various plate thicknesses and mounted on carriage 10. This chart device indicates the correct values and adjustments required for each particular thickness of plate being cut with a particularized torch and tip, and is adjustable to compensate for conditions which influence these values. For that purpose the chart device comprises a lower stationary chart section 30, and an upper chart section 31, adjustably movable along the upper edge thereof, and provided with a horizontal row of figures indicating plate thicknesses. The lower chart has a plurality of horizontal tabulations containing cutting data corresponding to respective plate thicknesses indicated in the upper chart section 31. This data may include speed of torch travel in feet per hour, or inches per minute, or feet per second, or both, cutting tip sizes, cutting oxygen pressure, and cubic feet of cutting oxygen consumed per foot of cut.

The proper cutting speed for a plate of a definite thickness depends on the shape of the cut, and various conditions of the plate. For instance, in making cuts having sharp corners, bevels or curves, the speed of the cutting torch should be decreased. If the plate is warm then the cutting speed should be increased, if cold it should be decreased, and if the plate has a considerable amount of scale on its surface, or is extra clean, the lineal cutting speed should be reduced or increased accordingly.

In order to adjust the chart device for these unusual conditions, there is provided on the upper chart section 31 a scale having an index or pointer 32, and the lower chart section 30 has a scale comprising a main pointer 33, and a series of auxiliary pointers 34 on opposite sides of said main pointer. When the two pointers 32 and 33 are in registry, the chart is set for normal plate conditions. By sliding the upper chart section 31 to effect registry of the pointer 32 with any one of the auxiliary pointers 34 in the lower chart section 30, the chart is corrected for abnormal conditions.

The slidable adjusting movement of the upper chart section 31 may be effected through a hand wheel 36 (see Fig. 1) supported on the carriage 10, and accessible for operation from the front of said carriage. The transmission from the hand wheel 36 is shown comprising a pinion 37 (see Fig. 2) fixed to the hand wheel shaft, and meshing with rack teeth 38 along one edge of the upper chart section 31.

An indicator slide 40 is movable across the face of the chart sections 30 and 31 into registry with that figure in the upper chart section 31 indicating the thickness of the plate to be cut, and is desirably in the form of a slotted bar or a vertical looped wire, which when moved into registry with said figure, lines up and encloses the corresponding data in the lower chart section 30.

The movement of the indicator slide 40 across the face of the charts 30, 31 is effected from a hand wheel 41 (Figs. 1 and 2) mounted on the carriage 10, and accessible for operation from the front of said carriage. The transmission between this hand wheel 41 and the slide 40 may be of any desired type. It is shown as including a bevel gear 42, mounted on the shaft 43 of the handle 41, and meshing with a bevel gear 44 secured to an axially fixed lead screw 45. Threaded on the lead screw 45 is a nut 46 to which is affixed an arm 47 rigid with the slide 40.

In order to correspondingly position the light source 26 and light reactive device 27 with respect to the slide 40, there is provided a second axially fixed lead screw 48, driven from the lead screw 45 through intermeshing gears 50, 51 and 52, and carrying a nut 53, secured to a yoke 54, with side arms carrying the members 26 and 27.

When the handle 41 is turned to set the slide 40 on the chart 31 in accordance with the thickness of the plate to be cut, the frequency control device is automatically set to deliver the proper frequency to the pre-amplifier and ultimately drive the synchronous motor 16, thus obtaining the proper torch speed for said plates.

In order to insure that the members 26 and 27 are stopped in proper alignment with the desired frequency control ring on the disc 22, there is provided an index device which may comprise a cam 55, secured to the lead screw 48 for rotation therewith, and provided with one or more recesses 56. A roller 57 carried on a pivot arm 58 is urged against the periphery of the cam 55 by a spring 59. When the roller 57 is in one of the recesses 56, the light 26 and the light reactive device 27 will be in proper alignment with one of the frequency control rows. The operator can tell when this position is reached by the feel of the handle 41 as it turns easily into correct position, and greater resistance is encountered in moving it out of correct position.

All of the parts shown in Fig. 2 are mounted on the carriage. The chart sections 30, 31, slide 40, and handles 36 and 41 are on the front side of the carriage, while the remaining parts are mounted on the rear side of the carriage and preferably in a suitable casing or housing. To facilitate a clear showing of the parts appearing in Fig. 2, they have been spread apart, and in somewhat different relative positions than they would occupy in commercial practice. Various other operating connections may be employed.

In Fig. 6 is shown a form of electrical system which may be employed for amplifying the minute current pulsations generated in the photo-electric cell 27 to a value necessary to operate the synchronous motor 16. In this system, the main input lines A are connected to a commercial source of alternating current which is usually 60 cycles, 115 volts.

*Low voltage circuit*

The current is branched off from point 71 on one line of the main to points 72 and 73, and through various transformers of a power amplifier B of well known construction to reduce the voltage to values suitable for operation of the tube filaments in said amplifier, and also to supply power to the tubes in a pre-amplifier C of well known construction. The current then returns to points 74 and 75, and then to point 76 on the other line of the main.

Current flows out of the pre-amplifier C at point 80 and passes through point 81, through a relay coil 82, through one filament 84 of the exciter lamp 26, and then to point 85 and returns to point 86 at the pre-amplifier C. Connected in parallel with the relay coil 82 and the filament 84 is a second filament 87 in the lamp 26, and a contact 88, operated by the relay 82. When current flows through the filament 84, the relay coil 82 is energized and the contact 88 is opened. When the filament 84 burns out and breaks the return circuit of the relay coil 82, the contact 88 closes, thereby lighting the filament 87. It is seen that the relay coil 82 serves as a safety device, and continues operation of the electronic frequency generator even though one of the filaments of the lamp 26 is burned out. The minute current pulsations generated by the photo-electric cell 27 are delivered to the pre-amplifier C through points 77 and 78.

Current from the main A is also delivered through a motor stop and start switch 130 in closed position thereof to point 91, to the primary of a power input transformer in the power amplifier B, returning to point 92 and then to main A.

*High voltage circuit*

When current flows in the primary of this power input transformer there is induced in the secondary windings, voltages necessary for the operation of the power amplifier B and the pre-amplifier C in the well known manner. These high voltages supply alternating current that is rectified through suitable means in the power amplifier B and applied to the plates of the various vacuum tubes employed.

With the disc motor 25 revolving the frequency control disc 22, and the exciter lamp 26 focused on to the photo-electric cell 27, and the filaments and the various vacuum tubes supplied with their proper voltages, it is only necessary to supply high voltages of direct current to obtain a power output from the power amplifier B. The output power from the power amplifier B flows in the center tapped primary winding of a power output transformer 93. There is then induced in the secondary winding between points 94 and 95 a current whose frequency is determined by the frequency control disc 22. This current flows from the secondary winding to points 94 and 97, through the running winding 98 of the synchronous motor 16 to point 100, and returns to point 95. There is also a parallel path from the point 97 to point 101 through contact 102 in the right hand dotted position shown, to points 103 and 104, through a switch 105, through one of the starting condensers 106, 107, 108, 109 for the motor 16, to point 111, through the starting winding 112 of the synchronous motor 16, and back to the point 95 of the secondary of the power output transformer 93. A relay 113 controls the timing closure of the contact 102, as will be described.

*Timing device*

The motor 16 is of the capacitor start type requiring one of the condensers 106, 107, 108, 109 in series with the starting winding 112, as will be more fully described. When a standard motor of this type is used on a standard commercial frequency, the motor armature is equipped with a centrifugal throw-out switch in the circuit of the starting winding 112. If a motor has been designed to run at a synchronous speed of 1800 armature revolutions per minute, then the centrifugal cut-out switch is so designed as to be opened or thrown out at approximately 1200 armature revolutions per minute. In the application of this type of capacitor start motor with frequency control, the standard type of centrifugal throw-out switch would not be suitable, as the armature must at times be rotating at synchronous frequencies as low as 600 revolutions per minute, and as high as 12,000 revolutions per minute.

It is common knowledge to those versed in the art that the power generated by the starting winding 112 must be available to bring the motor armature up to nearly synchronous speed, and the rotating electrical field which determines the synchronous rotating speed of the motor must be allowed to keep the armature in step at this frequency. It is not important that the starting winding 112 be cut off electrically just before the motor armature attains synchronous speed, but it is necessary that said starting winding remain connected long enough to bring the armature almost up to synchronous speed at the highest frequency. It is also necessary that the starting winding 112 be cut off after the armature has reached almost synchronous speed to allow the motor to rotate solely by the effect generated by the running winding 98. To apply the current to the starting winding 112 long enough to bring the armature up to nearly synchronous speed at the highest frequency, which may be as high as 400 cycles, and cutting it off electrically at this point, there is provided a synchronous timing motor 115, and a cam switch device 116 operated from said timing motor.

The cam switch device 116 comprises three cams 120, 121, and 122, mounted for rotation in unison on a shaft 123, driven from the timing motor 115 as shown in Figs. 7 and 8. The cam 120 is adapted to operate a switch 124 to move it into the solid line or dotted line position shown in Figs. 6 and 8, and similarly the cams 121 and 122 operate the two switches 126 and 127. During one revolution of the three cams 120, 121 and 122, the switch 124 is held in solid line position and against contact 125 from 0° to 10°, and in dotted line position and against contact 125' from 11° to 360°; the switch 126 is held in dotted line or closed position from 355° to 360°, and in solid line or open position during the rest of each revolution; and the switch 127 is held in dotted line or closed position from 15° to 255°, and in solid line or open position during the rest of each revolution.

The cams 120, 121 and 122 have projections of the required arcuate length, that on cam 120 being very short and extending through 10°, as shown in Fig. 8. Each cam projection may engage a spring finger which is alternately pushed up and then dropped, and each spring finger may have a projection to engage and operate its respective switch 124, 126 or 127.

When the motor start and stop switch 130 on the main line A is closed, current is not only rendered available to the power input transformers through points 91 and 92 as described, but current also flows from point 131, to points 132, 133 and 134, through contact 135 and switch 124, through the timing motor 115 to rotate said motor, to points 136, 137 and 72, and back to the main line at point 71. Switch 124 is closed at contact 125 from 0° to 10° during rotation of the cams. It breaks circuit at contact 125 and closes at contact 125' between 10° and 11°. It is of the quick action type, and is so constructed that it engages either contact 125' or 125 with no intermediate position except during the time required to effect the switchover. With switch 124 at contact 125', as shown in dotted line position, and the circuit of contact 125 opened, the current does not have to flow through the motor stop or start switch 130 to continue rotation of the timing motor 115 through the remainder of its timing cycle, but will flow from point 76 on one side of the main A to point 75, through the contact 125' and the switch 124 in the dotted line position, through the timing motor 115 to points 136, 137 and 72, and then to the other side of said main.

It is sometimes necessary for the cutting machine operator to move the drive unit 13 only a short distance. He will accomplish this by closing the switch 130, and after the motor 16 has just begun to move the drive unit 13, he will immediately open said switch to turn off said motor.

The mechanical shift of switch 124 from contact 125 to 125' at about 10½° of cam rotation allows the motor start switch 130 to be opened to stop the drive motor 16, yet providing current to be supplied to the timing motor 115 to return it to its original 0° position.

Switch 127 supplies current to the relay coil 113, and for that purpose is closed from 15° to 255° of cam rotation as described, to provide current flow through switch 130 to points 131 and 132, through switch 127 in closed dotted position shown, through relay coil 113, to points 137 and 72, and to point 71 on the main A. The energization of the relay coil 113 causes closure of the contact 102 in the right hand dotted position shown, and thereby causes flow of current to the starting winding 112 from the secondary of output transformer 93 as already described.

The purpose of switch 126, which is closed from 355° to 360° of cam rotation is to energize a timing relay 140 to open the circuit of the timing motor 115, and thereby allow said motor to rotate only through one timing cycle. When this switch 126 is closed in dotted position shown, current will flow through switch 130 to points 131, 132 and 133, through relay coil 140 to point 141, through switch 126 to points 136, 137 and 72, and to point 71 on the main line. Relay coil 140 will now become energized closing a contact 142 and opening contact 135 into dotted positions shown. When contact 142 is closed, the current does not have to flow from point 141, through switch 126, to points 136 and 137 and on to point 71 on the main, but flows directly from point 141 through contact 142, to point 137, and on to point 71 on the main. When contact 135 is open in dotted position shown, it does not allow current to flow to contact 125 and switch 124. This switch 124 is away from the contact 125 from 355° to 360°, while the timing motor 115 is receiving current through switch 124 and contacts 125'. Thus the timing motor 115 will continue to rotate until at the end of 360° switch 124 moves away from contact 125' and engages contact 125, but due to contact 135 being opened by virtue of the relay 140 being energized, the timing motor 115 will come to rest at its normal position, but is ready at any time thereafter to repeat its timing cycles.

The rotation of the timing motor 115 through one complete cycle takes about six seconds. Switch 127 which controls current to the starting winding 112 is closed for about four seconds. That is sufficient time to bring the armature of the drive motor 16 to synchronous speed at the maximum frequency of 400 cycles.

*Electrical circuit between pre-amplifier C and power amplifier B*

The wiring from the power amplifier B to the preamplifier C consists of a number of wires, which supply filament voltage and plate voltage for the tubes, and current for the exciter lamp 26, and which are not shown since these are well known in the art.

A matched impedance line from points 145, 146 on the pre-amplifier unit C, to points 147 and 148 on the power amplifier unit B, carry the output from said pre-amplifier unit and deliver it to the input of said power amplifier unit, and might be anywhere from 25 to 100 ft. in length to provide flexibility of location between said units.

The use of a matched impedance line is familiar to those versed in the art, and consists of an output transformer 150, connected across points 145 and 146 in the pre-amplifier C. At the other end of the line between the points 147 and 148 is an input transformer 151. These two transformers, 150 and 151 are equal in electrical impedance to eliminate any electrical distortion of the wave form.

In inductive electrical circuits employing alternating current, the impedance of a device drawing power increases with an increase in the frequency of the supply current. An attempt has been made to maintain the useful wattage employed by the motor 16 constant at all frequencies. To maintain the current as nearly constant as possible, the applied voltage must be increased to overcome the increase in impedance caused by an increase in the frequency, since current is equal to the applied voltage divided by the impedance of the receiving device.

By means to be described, the voltage is increased with an increase in frequency. In the curve shown in Fig. 9, the abscissa indicates frequency generated by the frequency control disc 22, and the ordinate shows the output voltage obtained to operate the synchronous driving motor 16. This voltage frequency characteristic follows substantially a straight line as indicated by the lines DE or FG. By an adjustment of a control which regulates the amount of amplification in the pre-amplifier C, curve DE rotates about some point O to various positions, such as that shown by the line FG. If this aforementioned amplification control is adjusted so that the output voltage varies with frequency and indicates values as shown by curve DE, then the amount of voltage is sufficient to operate the motor 16 at the frequencies indicated between points O and E, but is not sufficient to operate said motor at the frequencies indicated between points D and O. If this amplifier control is adjusted to deliver output voltages indicated by the line FG, then the voltages at the lower frequencies have been raised, but the voltages for the frequencies between points H and G have been lowered, and the motor 16 does not receive voltages powerful enough to operate it. To overcome this difficulty, there have been provided two constant impedance attenuators 152 and 153, inserted in the line between the pre-amplifier C output transformer 150 and the power amplifier B input transformer 151, and controlled from a switch 154. These constant impedance attenuators control the coupling between transformers 150 and 151, yet maintain the proper impedance relationship, and keep these two transformers electrically balanced at all times to avoid distortion of the wave form.

The attenuator 152 is effective to produce the voltage frequency characteristics indicated by the curve FH for the lower range of frequencies, as for instance up to 200 cycles, while the other attenuator 153 is designed for effective operation above this frequency range up to 400 cycles to produce the voltage frequency characteristics indicated by the curve IE. By switching the attenuator 152 or the attenuator 153 into the circuit at the proper time through operation of the switch 154, the characteristic indicated by the heavy lines FH or IE is obtained.

The operation of switch 154 is performed by the same mechanism that shifts the exciter lamp 26 and photoelectric cell 27 to selective annular rows on the frequency control disc 22. For that purpose the switch unit 154 is operated from a spring-pressed plunger 155 (Fig. 2) adapted to be engaged by a lever 156, carrying a cam follower roller 157 at its free end. A cam arm 158 rigid with the nut 46 is adapted to ride over the roller 157 when said nut reaches a position corresponding to a control setting of above 200 cycles. In this position lever 156 pushes the plunger 155, and thereby operates the switch 154 to cut out the attenuator 152 and cut in the other attenuator 153 to produce the voltage frequency characteristics indicated by curve IE. When the control mechanism is set for a frequency below 200 cycles, the nut 46 will be to the left of the position shown in Fig. 2, so that the attenuator 152 will be cut in and the other attenuator 153 cut out to produce the voltage frequency characteristics indicated by curve FH.

*Means for regulating the magnitude of the output voltage*

When the switch 130 is closed to start the synchronous driving motor 16, current will flow from point 94 to points 96 and 97, through the motor running winding 98, to point 100, and returns to point 95. Current also flows from point 97, to point 101. It is assumed that motor 16 is just being started, so that relay coil 113 will become energized for the duration of time necessary to provide current through the starting winding 112. When relay coil 113 is energized, contact 102 is closed in dotted right-hand position shown in Fig. 6, which means that current continues on a path from point 101, through said contact, to point 103, and on through the starting winding 112, eventually returning to point 95.

Points 95 and 165 are grounded, so that the voltage between points 165 and 96 is found equal to that between points 94 and 95. A slightly lower voltage exists between points 165 and 166, and a still lower voltage between points 165 and 167.

A condenser 168 is connected across the points 165 and 167. It is a well known action of condensers in alternating current circuits, that their impedance decreases with an increase in frequency. Therefore if the frequency generated by the frequency control disc 22 is raised, the voltage between points 165 and 167 will be lowered, and if the frequency is lowered, the voltage between points 165 and 167 will be raised.

This condenser action is utilized by use of a triode rectifying vacuum tube 170, which allows negligible current to flow through it in one direction only. The output from this tube 170 at point 171 flows from this point to point 172 and up to the pre-amplifier C, to control the amount of amplification of the pre-amplifier B. The voltage obtainable in this manner from point 171 is applied to a control grid of one of the amplifying tubes in the pre-amplifier C, and controls the output voltage in such a manner that the output voltage is proportional to its frequency. This automatic device regulates the overall amplification value of the pre-amplifier in such a manner that the output voltage is always the correct value for each operating frequency.

It is desirable to employ a slightly higher voltage on the drive motor 16 during the starting period. For that purpose there is provided a resistor 175 between points 96 and 166, and a contact 173, which when closed short circuits this resistor. A contact 174 is pivotally supported at its base between the contacts 102 and 173, and is operated from the relay coil 113 to close or open said contacts. This contact 173 will always be closed when relay coil 113 is not energized.

During part of the timing cycle, the relay coil 113 is energized, so that the contact 173 across the resistance 175 will be open. With this contact 173 open, the percentage of voltage drop between points 165 and 167 will be lowered, and the ultimate control voltage applied along the output wire at the point 172 will be lowered. With a lower control voltage applied to the pre-amplifier from point 172, the actual output voltage will be slightly higher than would be without the series resistor 175 connected in the circuit.

Upon de-energization of the relay coil 113, the contact 173 is closed, so that resistor 175 will be short-circuited, and the actual output voltage lowered.

*Switching means for starting condensers*

The synchronous driving motor 16 is of the capacitor start type, requiring a starting condenser in series with the starting winding 112. The purpose of this condenser is to obtain an amount of electrical shift of the phase, depending upon the frequency of the applied current and the capacity of said condenser.

With the wide range of frequencies employed in operating motor 16, it was found that the higher the frequency, the lesser the capacity required. For synchronous motor operation from 20 to 400 cycles, it was found that four condensers 106, 107, 108 and 109 of different capacity are required to cover this range of frequencies.

For instance, condenser 106 has proper capacity for frequencies from about 20 to 100 cycles per second; condenser 107 for frequencies of about 100 to 200 cycles; condenser 108 for frequencies of about 200 to 300 cycles; and condenser 109 for frequencies of about 300 to 400 cycles.

The proper condenser is connected in series with the starting winding 112 by the same mechanism, which shifts the exciter lamp 26 and photoelectric cell 27 into registry with a selected row of the frequency control disc 22. For that purpose four terminal strips 180, 181, 182 and 183 connected to condensers 106, 107, 108 and 109 respectively are mounted alongside of each other as shown in Fig. 2, while a conductor strip 184 is mounted below said terminal with one end corresponding to point 104. Rigid with the arm 47 are a pair of switch blades 185 and 186 carrying brushes riding in electrical contact with the upper and lower strips, and serving to connect the proper condenser in series with the starting winding 112.

To generate three phase alternating current three identical frequency control discs would be mounted on the same synchronous motor shaft. Each disc would be provided with a light source and photo cell combination, but with all three lamps and photo-electric cells mechanically tied together. If the light focused on the first control disc was just commencing to pass through the light transmitting section and on to the first photo-electric cell, then the second control disc would be so arranged that it would be one-third of a cycle behind the first disc, and the third disc would be one-third of a cycle behind the second disc. With three separate frequency control discs and three separate amplifier units, it is possible to generate three alternating currents whose phase relationship has been determined by the mechanical arrangement of the three frequency discs. To shift to another frequency, it would only be necessary to mechanically shift the three photo-electric cell combinations in registry with the desired annular frequency control row.

As many changes could be made in the above method and apparatus, and many apparently widely different embodiments of this invention could be made without departing from the scope of the claims, it is intended that all matter con-

What is claimed is:

1. A torch cutting machine having a movable carriage, a tracing unit and a torch, both supported on said carriage, and connected together for movement crosswise of the movement of said carriage, a synchronous motor for driving said tracing unit, and means for generating current of different frequencies and delivering it to said motor to operate said motor at selected speeds.

2. A torch cutting machine having a movable torch, a synchronous motor for moving said torch over a plate to be cut, means for delivering alternating current to said motor to drive said motor, and means for changing the frequency of the current delivered to said motor in accordance with the thickness of the plate to be cut.

3. A torch cutting machine having a movable torch, a synchronous motor for moving said torch, a movable control member, and means automatically responsive to changes in the position of said control member, for generating alternating current of selected frequencies corresponding to the position of said control member, and delivering it to said motor to operate said motor at a speed corresponding to the selected frequency.

4. In a torch cutting machine, the combination of a movable torch, a synchronous motor for driving the torch at cutting speed over the plate to be cut, means for generating periodic current pulsations at selected frequencies depending on the desired cutting speed, means for amplifying said current pulsations to a value necessary to operate said motor therefrom, and means for delivering said amplified current pulsations to said motor to operate said motor at the desired speed.

5. A torch cutting machine having a movable torch, a drive unit for the torch comprising a synchronous motor for moving said torch over the work, an indicator device indexed with a tabulation of different thicknesses of plate to be cut, and means automatically responsive to the setting of said indicator device to any selected index for generating currents for said motor of a frequency corresponding to the proper cutting speed for the plate thickness selected on said device.

6. In a torch cutting machine, the combination of a movable torch, a synchronous motor for moving said torch over a plate to be cut, a chart showing different thicknesses of plate to be cut, an indicator device movable over said chart, means automatically responsive to the setting of said indicator device to any selected point on said chart for generating periodic current pulsations at selective frequencies corresponding to proper cutting speed for the plate thicknesses selected on said device, means for amplifying said current pulsations to a value necessary to operate said motor therefrom, and means for delivering said amplified current pulsations to said motor to operate said motor at the desired speed.

7. A torch cutting machine including a movable torch, a synchronous motor for driving the torch at a cutting speed over the plate to be cut, means for generating current pulsations of different frequencies, and including a movable control member having a plurality of rows of conformations controlling the frequency of said pulsations, and means for selecting any one of said rows for operation to obtain current of corresponding frequency, means for amplifying said current pulsations to a value necessary to operate said motor therefrom, and means for delivering said amplified current pulsations to said motor to operate said motor at the desired speed.

8. A torch cutting machine including a movable torch, a synchronous motor for driving the torch at cutting speed over the plate to be cut, a member for generating current pulsations, a rotatable control disc having annular concentric rows of conformations for determining the frequency of the current pulsations generated by said member, said frequency being determined by the positioning of said member with respect to said rows, means for adjustably moving said member relatively with respect to said disc to correspondingly change the frequency of the generated current pulsations, means for amplifying said current pulsations to a value necessary to operate said motor, and means for operating said motor from the amplified current.

9. In a torch cutting machine, the combination comprising a movable torch, a synchronous motor of the capacitor start type for driving the torch at a cutting speed over the plate to be cut, a plurality of condensers of different capacity, each suitable for a different range of frequency of the motor operating current, means for generating current of selected frequencies and impressing it on said motor to operate said motor at selected speeds, control means for selecting the frequency of the current to be generated, and switching means automatically operable upon the setting of the control means to a selected frequency for connecting the proper corresponding condenser in the circuit of the starting winding of said motor.

10. In a torch cutting machine, the combination comprising a movable torch, a synchronous motor for driving the torch at a cutting speed over the plate to be cut, means for generating current pulsations of selected frequency, means for amplifying said pulsations to a value necessary to operate said motor, and including a pair of constant impedance attenuators, each determining a different output voltage frequency characteristic, one of said attenuators being suitable for the lower range of frequency, and the other attenuator for the higher range, control means for selecting the frequency of the current to be generated, and means automatically operable upon the setting of the control means to a selected frequency for switching into operation constant impedance attenuator suitable for the selected frequency, to obtain the desired output voltage frequency characteristic.

11. In a torch cutting machine, the combination comprising a movable torch, a synchronous motor for driving the torch at a cutting speed over the plate to be cut, and including a starting winding, means for generating current of selected frequencies and delivering it to said motor to operate said motor at selected speeds, and means for delivering current to said winding for a predetermined period, and automatically disconnecting said winding from said current at the end of said period, irrespective of the frequency of the motor current, to bring the motor armature up to nearly synchronous speed.

CHESTER MOTT.
ALFRED F. CHOUINARD.